United States Patent Office 3,102,035
Patented Aug. 27, 1963

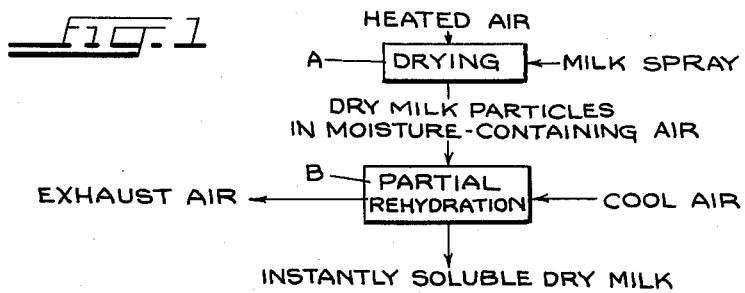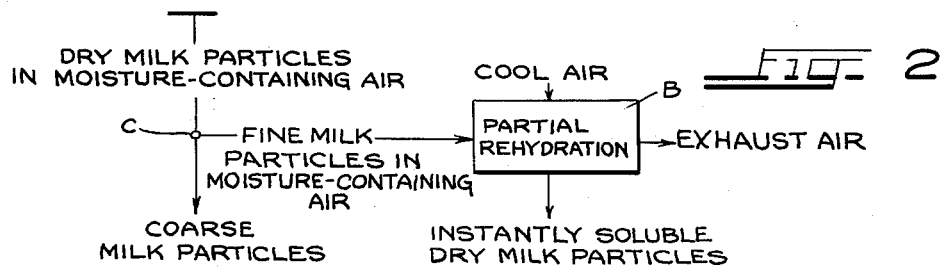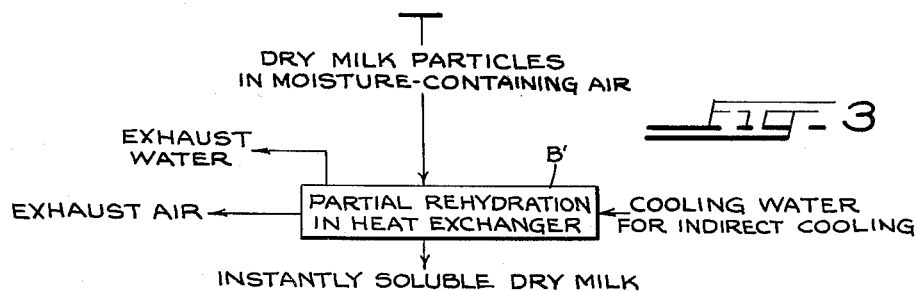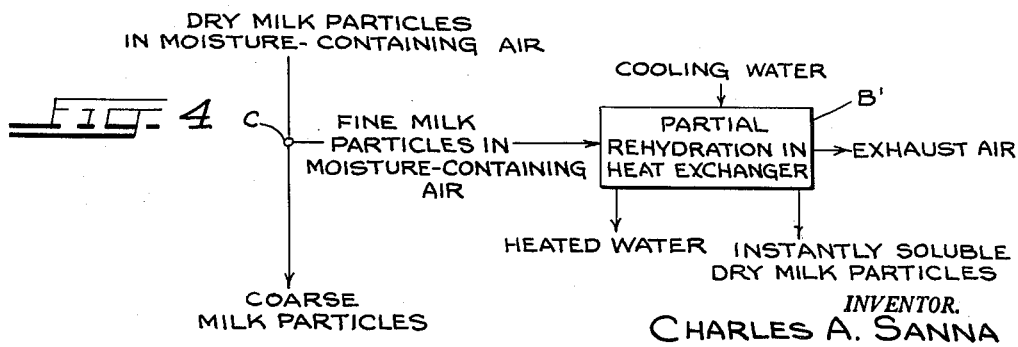

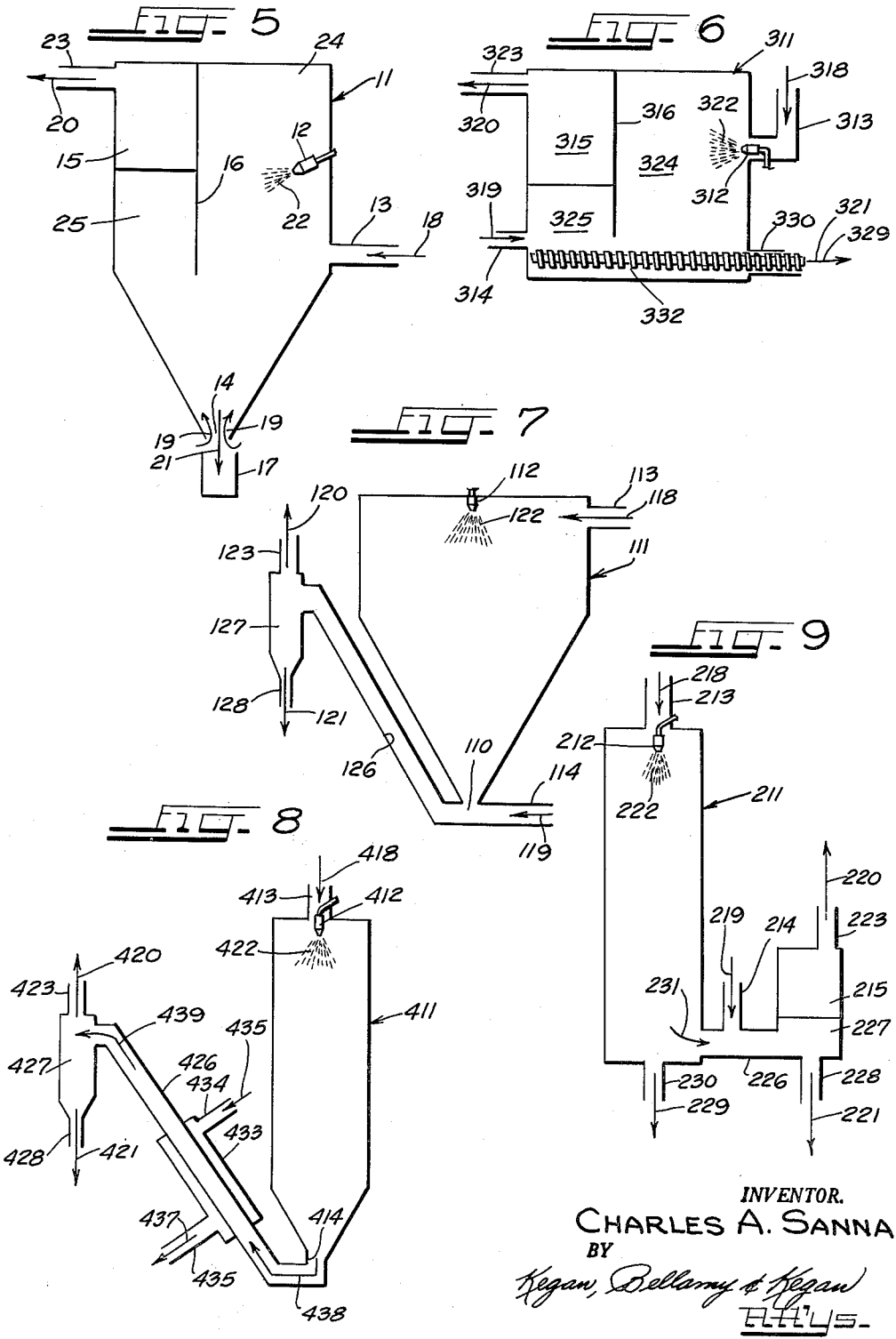

3,102,035
PROCESS FOR PRODUCING INSTANTLY SOLUBLE NONFAT DRY MILK
Charles A. Sanna, Menomonie, Wis., assignor to Sanna Dairies, Inc., Madison, Wis., a corporation of Wisconsin
Filed Feb. 27, 1961, Ser. No. 92,039
3 Claims. (Cl. 99—203)

The present invention relates generally to making nonfat dry milk from fluid skim milk, and more particularly to a simple, inexpensive, single stage process and apparatus for directly producing an instantly soluble, free flowing, relatively dust-free, nonfat dry milk powder of excellent quality.

As used in this specification and in the appended claims, the term "instantly soluble" means that the product readily dissolves in cold water with little or no agitation. More specifically, if ½ teaspoonful of instantly soluble power produced in accordance with the present invention is placed on the surface of 100 cubic centimeters of still water at 65° F., contained in a glass 250 cc. beaker, only 3 to 9 seconds are required for the product to become dispersed.

In the conventional processes for producing nonfat dry milk, droplets of skim milk are sprayed into a chamber containing heated air which causes a transfer of moisture from the milk droplets to the air, thereby producing particles of nonfat dry milk containing approximately 1½% to 3½% moisture, which particles are then separated from the moisture-containing air. Such dry milk particles are not instantly soluble and usually require an additional treatment before becoming so.

This additional treatment is eliminated by the subject process which partially rehydrates the dry milk particles before they are separated from the moisture-containing air, said partial rehydration causing the particles to acquire the desired instant solubility. More specifically, the mixture of dry milk particles and moisture-containing air is partially cooled before separation to cause a retransfer of moisture from the air to the particles, thereby raising the moisture content of the rehydrated particles to between 2½% and 4½%, said increase in moisture causing an agglomeration of the particles, partial conversion of the lactose in the particles to a more wettable phase and a reduction of fines, thereby imparting a soluble character to the resulting powder. Rehydration by partial cooling may be performed by introducing a stream of unheated air at atmospheric conditions into the mixture, or by passing the mixture through a heat exchanging zone, or the like.

Although the subject process rehydrates the dry milk particles enough to impart the desired instant solubility thereto, the increase in moisture content is not enough to render the particles sticky or cause them to spoil during storage, thereby eliminating redrying of the rehydrated particles as would otherwise be necessary if the moisture content was excessive.

Powder particles rehydrated by the subject process do not break up under ordinary conditions of handling and packaging, are relatively uniform in size thereby avoiding segregation by size and facilitating handling and packaging, and have an improved over-all quality, including flavor.

The subject process may be performed entirely within a single enclosed, sanitary, contamination-proof apparatus constructed by merely adding, to a conventional spray chamber, means for partially cooling the mixture before the dry particles are separated from the moisture-containing air. The partial cooling means may be a conduit for introducing unheated or refrigerated air into the mixture, or a heat exchanger through which the mixture is passed, or the like.

The invention may also be used to produce other powdered lacteal materials.

Therefore an object of the present invention is to provide a process for producing instantly soluble nonfat dry milk in a simple, less costly single stage operation.

Another object is a process for producing instantly soluble nonfat dry milk which does not require redrying.

Still another object is a process for producing instantly soluble nonfat dry milk which is not sticky, does not break up under ordinary conditions of handling and packaging, and has an improved flavor and uniform particle size.

A further object is a process of the type described and in which the material being processed is at no time exposed to areas of possible contamination.

Still another object is an uncomplicated, inexpensive, sanitary apparatus for performing the subject process.

Other objects and advantages are inherent in the structure claimed and disclosed as will become apparent to those skilled in the art from the following detailed description in conjunction with the accompanying drawings wherein:

FIG. 1 is a flow diagram of one embodiment of the subject process;

FIGS. 2 to 4 are fragmentary flow diagrams of other embodiments of the subject process; and FIGS. 5 to 9 are schematic diagrams of apparatus for performing the subject process.

A flow diagram of a basic embodiment of the subject process is illustrated in FIG. 1 wherein heated air and a skim milk spray are brought together in a drying step A to produce a mixture of nonfat dry milk particles dispersed in moisture-containing air. This mixture is then subjected to a partial rehydration step B in which cool or unheated air is introduced into the mixture to partially cool the latter and cause some of the moisture in the moisture-containing air to retransfer to the dry milk particles. The air containing the remaining moisture is then exhausted, and the resulting instantly soluble nonfat dry milk particles are collected for subsequent packaging.

The process illustrated in FIG. 1 may be practiced by the apparatus shown schematically in FIGS. 5 and 7. Referring initially to FIG. 5, there is generally indicated a processing chamber 11 separated into two upper sections 24, 25 by a vertically extending separating member 16. Extending into upper section 24 are a nozzle 12 for spraying droplets of skim milk, and communicating with section 24 is a hot air conduit 13 for introducing a stream of heated air represented by the arrow 18. The skim milk droplets 22 are dried by hot air 18 in chamber section 24 to produce a mixture of dry milk particles dispersed in moisture-containing air. Cool, unheated or refrigerated air represented by the arrows 19 is directed upwardly into processing chamber 11 through an opening 14 in the bottom thereof and cools the mixture to cause a retransfer of some of the moisture from the moisture-containing air to the dry milk particles. The resulting instantly soluble particles, represented by the arrow 21, drop through the opening 14 into a collecting receptacle 17. The air 20 containing the remaining moisture is exhausted from processing chamber 11 through chamber upper section 25 and through filter media 15, the latter being for removal of any dry milk particles which might remain in the exhaust air, and then out through an exhaust conduit 23. The filter media can be of any conventional type well known to those skilled in the art of spray drying skim milk or other liquid lacteal material.

In the apparatus illustrated in FIG. 7 a milk spray 122 from a top nozzle 112 is dried in the usual manner by hot air 118 entering chamber 111 through upper conduit 113 to produce the previously described mixture which descends through bottom opening 110 to be partially cooled with a stream 119 of unheated air entering through lower conduit 114. The mixture is cooled by the unheated air as the two pass through a partial rehydration conduit 126 extending angularly upwardly to a chamber 127 where the resulting instantly soluble particles 121 are separated by cyclonic action or other conventional separating means and drop through a conduit 128 to a collecting receptacle (not shown), and the air 120 containing the remaining moisture is exhausted through an exhaust conduit 123.

FIG. 2 is a fragmentary flow diagram of an embodiment of the subject process in which greater control can be exercised as to the size of the particles. In the mixture resulting from the drying step A in FIG. 1, there are apt to be particles of both fine and coarse size. In the embodiment of FIG. 2 the coarse milk particles in the mixture are separated therefrom at C, before the partial rehydrating step B, thereby leaving only fine milk particles to be rehydrated and avoiding further agglomeration of the mixture's coarse milk particles, the latter particles being substantially instantly soluble already. The instantly soluble particles resulting from the reverse drying step B may, if desired, be subsequently recombined with the coarse particles previously separated at C or the two collections of large-sized particles may be packed and marketed separately.

FIGS. 9 and 6 show apparatus for practicing the embodiment illustrated in FIG. 2. In the apparatus of FIG. 9 hot air 218 entering chamber 211 through a top conduit 213 dries a spray of milk droplets 222 emanating from a top nozzle 212 to produce the usual mixture which descends to the bottom of chamber 211 and from which coarse-sized particles 229 separate by gravity and drop through bottom conduit 230. The remainder 231 of the mixture, from which the coarse-sized particles have been separated, passes through a partial rehydration conduit 226 where the remainder is cooled by a stream of unheated air 219 introduced by conduit 214, resulting in the retransfer of some moisture to the entrained remaining fine-sized particles. The resulting instantly soluble particles 221 are separated in a chamber 227 from the air 220 containing the rest of the moisture. The instantly soluble particles fall by gravity through a lower conduit 228 to the usual collecting receptacle and the air containing the moisture passes through conventional filter media 215 and out through an upper exhaust conduit 223.

In the apparatus of FIG. 6, processing chamber 311 is divided into two sections 324, 325 by vertically extending separating member 316. Milk droplets 322 are sprayed into section 324 of chamber 311 through sidewall nozzle 312 and are dried in the chamber by hot air 318 entering through side-wall conduit 313 to produce the usual mixture of coarse and fine-sized dry milk particles dispersed in moisture-containing air. The coarse particles in this mixture fall by gravity to the bottom of chamber 311 where they are moved outwardly through a lower outlet conduit 330 by a bottom auger or screw conveyor 332. The mixture from which the coarse-sized particles have been separated is sucked into chamber section 325 where the mixture is cooled with a stream of unheated air 319 entering section 325 through a lower inlet conduit 314. This causes the previously described retransfer of moisture to the fine-sized particles which agglomerate and fall to the bottom of chamber 311 from where they are removed by auger 332. The air 320, containing the rest of the moisture, is exhausted upwardly through a filter media 315 and outwardly through an upper exhaust conduit 323 in the usual manner.

Referring now to the embodiment of the process illustrated in FIG. 3 this embodiment differs from the embodiment of FIG. 1 only in that the partial cooling of the mixture and rehydration of the milk particles takes place in a heat exchanger $B^1$ rather than the mixture being cooled by unheated air.

Apparatus for performing this embodiment is illustrated in FIG. 8. This apparatus is substantially the same as the apparatus illustrated in FIG. 7, the only difference being that the partial rehydration conduit 426 in FIG. 8 runs through a heat exchanger 433, whereas the partial rehydration conduit 126 in FIG. 7 does not; and the apparatus illustrated in FIG. 8 has no conduit for introducing unheated air whereas the apparatus of FIG. 7 does have such a conduit (114).

More specifically, the apparatus of FIG. 8 comprises a processing chamber 411 having a top nozzle 412 for spraying liquid lacteal material droplets 422 into the chamber where they are dried by a stream of heated air 418 entering the chamber through a top conduit 413. The resulting mixture 438 descends through a bottom opening 414 in the chamber and is sucked upwardly through partial rehydration conduit 426 by conventional exhaust means (not shown). While passing through this conduit the resulting mixture is partially cooled by a heat exchanger 433 constituting a jacket around conduit 426. The cooling action is caused by cooling water 435 entering through an inlet conduit 434 in the heat exchanger, which water absorbs heat from the conduit 426 thereby cooling the mixture 438; and the heated water 437 then passes outwardly through a conduit 435. The partially cooled mixture 439 passes into a separating chamber 427 wherein the rehydrated particles 421 are separated and drop through a lower collecting conduit 428 while the air 420 containing the remaining moisture passes outwardly through an upper exhaust conduit 423.

The embodiment of the subject process illustrated in FIG. 4 is substantially the same as that illustrated in FIG. 2 in that the coarse milk particles are separated from the mixture at C before the partial rehydration step $B^1$. The only difference between these two processes is that the partial rehydration step $B^1$ takes place in a heat exchanger rather than air cooling the mixture from which the coarse-sized particles have been separated.

*Example I*

The following data relate to an embodiment of the subject process wherein unheated air is used in the partial rehydration step.

Solids content of skim milk by weight_____ 43%.
Preheat temperature of skim milk___ 155° F.
Atomizing pressure_____ 2100 lbs. per sq. in.
Nozzle size_____ 40 x 40.
Rate of introduction of skim milk___ 2,875 lbs. per hour.
Rate of introduction of drying air____ 25,000 cubic feet per minute.
Temperature of drying air_____ 295° F.
Relative humidity of drying air_____ Substantially 0%.
Yield of nonfat dry milk_____ 1,235 lbs. per hour.
Percent coarse-sized particles_____ 45%.
Percent fine-sized particles_____ 55%.
Moisture content before cooling_____ 2.95%.
Rate of introduction of cooling air___ 11,500 cubic feet per minute.
Temperature of cooling air_____ 64° F.
Relative humidity of cooling air_____ 52%.
Rate at which air is exhausted_____ 43,000 cubic feet per minute.
Temperature of exhausted air_____ 164° F.
Relative humidity of exhausted air___ 9½%.
Moisture content of instantly soluble powder_____ 4.25%.

The solids content of the skim milk may vary from approximately 25% to 50%, and its preheat temperature may range between around 140° F. to 170° F. The temperature of the drying air may run between about 280° F. and 450° F. In the resulting mixture of nonfat dry milk particles and moisture-containing air the moisture content of the milk particles runs between about 1½% and 3½%, and the relative humidity of the moisture-containing air ranges from approximately 5% to around 50%, said air being cooled to an equilibrium temperature of around 190° F. during the drying step.

The embodiments described and illustrated herein are merely illustrative of some of the many forms which the invention may take in practice without departing from the scope of the present invention as defined in the appended claims.

I claim:
1. A continuous process for directly producing an instantly soluble, nonfat dry milk in powdered form from skim milk, said process comprising the steps of:
   drying a spray of skim milk droplets having a moisture content between about 50% to 75% with heated air having a temperature ranging between about 280° F. and 450° F. so as to produce a mixture of milk particles dispersed in moisture-containing air, the said milk particles having a moisture content between about 1½% to 3½%;
   partially rehydrating and agglomerating the milk particles by partially cooling the mixture of dry milk particles dispersed in moisture-containing air so as to cause the re-transfer of some of the moisture from the moisture-containing air to the milk particles such that the milk particles so treated exhibit a moisture content between about 2½% to 4½; and
   separating the partially rehydrated particles from the air containing the remaining moisture.

2. A process as recited in claim 1 wherein said partial cooling step comprises introducing unheated air at atmospheric conditions into said mixture before said separating step.

3. A process as recited in claim 1 wherein said partial cooling step comprises passing said mixture through a heat exchanging zone prior to said separating step.

References Cited in the file of this patent
UNITED STATES PATENTS

| | | |
|---|---|---|
| 1,730,048 | Zizinia | Oct. 1, 1929 |
| 2,413,420 | Stephanoff | Dec. 31, 1946 |
| 2,555,516 | Stoneman | June 5, 1951 |
| 3,039,107 | Bradford | June 12, 1962 |